US010005470B2

(12) United States Patent
Jeong et al.

(10) Patent No.: US 10,005,470 B2
(45) Date of Patent: Jun. 26, 2018

(54) APPARATUS AND METHOD OF ESTIMATING ROAD SLOPE USING GRAVITATIONAL ACCELERATION SENSOR

(71) Applicants: HYUNDAI MOTOR COMPANY, Seoul (KR); KIA MOTORS CORPORATION, Seoul (KR)

(72) Inventors: Dong Hoon Jeong, Osan-si (KR); Byeong Wook Jeon, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 474 days.

(21) Appl. No.: 14/941,377

(22) Filed: Nov. 13, 2015

(65) Prior Publication Data

US 2016/0332634 A1    Nov. 17, 2016

(30) Foreign Application Priority Data

May 14, 2015    (KR) .................. 10-2015-0067329

(51) Int. Cl.
*B60W 40/076* (2012.01)
*F16H 59/50* (2006.01)
*F16H 59/66* (2006.01)

(52) U.S. Cl.
CPC .......... *B60W 40/076* (2013.01); *F16H 59/50* (2013.01); *F16H 59/66* (2013.01); *B60Y 2400/304* (2013.01); *F16H 2059/663* (2013.01); *F16H 2306/00* (2013.01)

(58) Field of Classification Search
CPC ...... B60W 40/076; F16H 59/66; F16H 59/50; F16H 2059/663; F16H 2306/00; B60Y 2400/304
See application file for complete search history.

(56) References Cited

U.S. PATENT DOCUMENTS

| 2014/0188350 A1* | 7/2014 | Popham | B60W 10/06 701/49 |
| 2015/0158498 A1* | 6/2015 | Jeon | B60W 50/10 701/101 |
| 2016/0082974 A1* | 3/2016 | Jeong | B60W 40/076 702/154 |

FOREIGN PATENT DOCUMENTS

| JP | 57-160042 A | 10/1982 |
| JP | 11-351864 A | 12/1999 |
| JP | 2013-217389 A | 10/2013 |
| KR | 10-2015-0114749 A | 10/2015 |
| KR | 10-1558388 B1 | 10/2015 |
| KR | 10-1601104 B1 | 3/2016 |

* cited by examiner

*Primary Examiner* — David J Hlavka
(74) *Attorney, Agent, or Firm* — McDermott Will & Emery LLP

(57) ABSTRACT

A method of estimating road slope using a gravitational acceleration sensor, includes determining whether a driving mode of a vehicle is a towing or freight carrying mode, calculating a difference value between road slope measured using the gravitational acceleration sensor and road slope measured using a driving torque when the driving mode of the vehicle is the towing or freight carrying mode, estimating road slope by correcting the road slope measured using the gravitational acceleration sensor based on the difference value, and controlling a shift of the vehicle according to the estimated road slope.

17 Claims, 4 Drawing Sheets

APPARATUS AND METHOD OF ESTIMATING ROAD SLOPE USING GRAVITATIONAL ACCELERATION SENSOR

CROSS-REFERENCE TO RELATED APPLICATION

This application claims the benefit of priority to Korean Patent Application No. 10-2015-0067329, filed with the Korean Intellectual Property Office on May 14, 2015, the entire contents of which are incorporated herein by reference.

TECHNICAL FIELD

The present disclosure relates to an apparatus and a method of estimating road slope using a gravitational acceleration sensor. More particularly, the present disclosure relates to an apparatus and a method of estimating road slope using a gravitational acceleration sensor that estimates road slope by reflecting a driving resistance increased while towing or carrying freight.

BACKGROUND

Generally, methods of estimating road slope are classified into methods using a driving torque and methods of using a gravitational acceleration sensor.

A load of a vehicle changes depending on road slope, so an acceleration rate of a vehicle speed regarding the driving torque is changed according to road slope. Thus, the method of estimating road slope using the driving torque estimates road slope by using a difference of the increase rate of the vehicle speed. The method of estimating road slope using the driving torque can estimate road slope without an additional sensor. However, the method of estimating road slope by using the driving torque cannot accurately estimate road slope due to change of the driving torque. Thus, an excessive error of road slope estimation occurs due to changes of the driving torque. Moreover, the method of estimating road slope using the driving torque cannot distinguish a load of road slope from a load of carrying freight or towing.

On the other hand, the method of estimating road slope using the gravitational acceleration sensor involves detecting a longitudinal acceleration when the vehicle is located on a slope. Thus, the method of estimating road slope using the gravitational acceleration sensor involves calculating a pitching slope of the vehicle by comparing the longitudinal acceleration with the increase rate of the vehicle speed. Since the pitching slope is road slope if wheels of the vehicle have a fixed height, the method of estimating road slope using the gravitational acceleration sensor can estimate road slope regardless of the driving torque. Also, the method of estimating road slope using the gravitational acceleration sensor can estimate road slope even though the vehicle carries freight or is towed.

The method of estimating road slope using the gravitational acceleration sensor has high accuracy and fast responsiveness compared to the method of estimating road slope using the driving torque. However, when driving resistance is increased due to towing or carrying freight, the method of estimating road slope using the gravitational acceleration sensor may not reflect the increased driving resistance. On the contrary, the method of estimating road slope using the driving torque can compensate the driving resistance by estimating road slope as an upward slope.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to provide an apparatus and method for estimating road slope by using a gravitational acceleration sensor having advantages of correctly estimating road slope by reflecting a driving resistance that is increased while towing or carrying freight.

An exemplary embodiment of the present disclosure provides a method of estimating road slope by using a gravitational acceleration sensor that may include: determining whether a driving mode of a vehicle is a towing or freight carrying mode; calculating a difference value between road slope by using the gravitational acceleration sensor and road slope by using a driving torque when the driving mode of the vehicle is the towing or freight carrying mode; estimating road slope by correcting road slope by using the gravitational acceleration sensor based on the difference value; and controlling a shift of the vehicle according to the estimated road slope.

The method may further include estimating road slope by using the gravitational acceleration sensor when the driving mode of the vehicle is not the towing or freight carrying mode.

The method may further include detecting a signal of chassis dynamometer, and determining whether the driving mode of the vehicle is the towing or freight carrying mode when the signal of chassis dynamometer is not detected.

The method may further include estimating road slope by using the driving torque when the signal of a chassis dynamometer is detected.

The estimation road slope by correcting road slope by using the gravitational acceleration sensor may add a maximum value of the difference value to the road slope by using the gravitational acceleration sensor.

The determination of the driving mode of the vehicle may include: determining whether a mode determination condition is satisfied; determining whether the vehicle is running below a predetermined speed for a predetermined time; comparing the road slope by using the gravitational acceleration sensor with a predetermined value when the vehicle is not running below the predetermined speed for the predetermined time; and determining that the driving mode of the vehicle is the towing or freight carrying mode when the road slope by using the gravitational acceleration sensor is less than the predetermined value.

The mode determination condition may be satisfied when a shift stage is a D stage, signals of the gravitational acceleration sensor and a vehicle speed sensor are valid, and a vehicle speed, a position value of an accelerator pedal, an engine speed, and an engine torque are within a predetermined range.

The comparison of the road slope by using the gravitational acceleration sensor with the predetermined value may compare an absolute value of the road slope by using the gravitational acceleration sensor with a first predetermined value, and a sum of road slope by using the gravitational acceleration sensor and a second predetermined value with the road slope by using the driving torque.

Another exemplary embodiment of the present disclosure provides an apparatus for estimating road slope by using a gravitational acceleration sensor that may include: a data detector configured to detect data for estimating road slope; and a controller configured to determine whether a driving mode of a vehicle is a towing or freight carrying mode and estimate road slope by correcting road slope by using the gravitational acceleration sensor based on a difference value between road slope by using the gravitational acceleration sensor and road slope by using a driving torque when the driving mode of the vehicle is the towing or freight carrying mode.

The controller may estimate road slope by using the gravitational acceleration sensor when the driving mode of the vehicle is not the towing or freight carrying mode.

The controller may detect a signal of a chassis dynamometer and determine whether the driving mode of the vehicle is the towing or freight carrying mode when the signal of the chassis dynamometer is not detected.

The controller may estimate road slope by using the driving torque when the signal of the chassis dynamometer is detected.

The controller may estimate road slope by adding a maximum value of the difference value to the road slope by using the gravitational acceleration sensor.

The controller may determine whether a mode determination condition is satisfied and determine whether the driving mode of the vehicle is the towing or freight carrying mode by comparing the road slope by using the gravitational acceleration sensor with a predetermined value when the mode determination condition is satisfied and the vehicle is not running below a predetermined speed for a predetermined time.

The mode determination condition may be satisfied when a shift stage is a D stage, signals of the gravitational acceleration sensor and a vehicle speed sensor are valid, and a vehicle speed, a position value of an accelerator pedal, an engine speed, and an engine torque are within a predetermined range.

The controller may determine that the driving mode of the vehicle is the towing or freight carrying mode when an absolute value of the road slope by using the gravitational acceleration sensor is less than a first predetermined value and a sum of road slope by using the gravitational acceleration sensor and a second predetermined value is less than the road slope by using the driving torque.

The data may include information on at least one of a speed of the vehicle, a position value of an accelerator pedal, a position value of a brake pedal, a shift stage of the vehicle, a wheel speed of the vehicle, and engine speed and a steering angle of the vehicle.

According to an exemplary embodiment of the present disclosure as described above, shifting of the vehicle can be controlled by reflecting driving resistance when the driving resistance is increased due to towing or carrying freight, so drivability of the vehicle can be improved.

In addition, an engine torque can be compensated while accelerating by predicting an increased vehicle weight.

DETAILED DESCRIPTION

Figure 1:
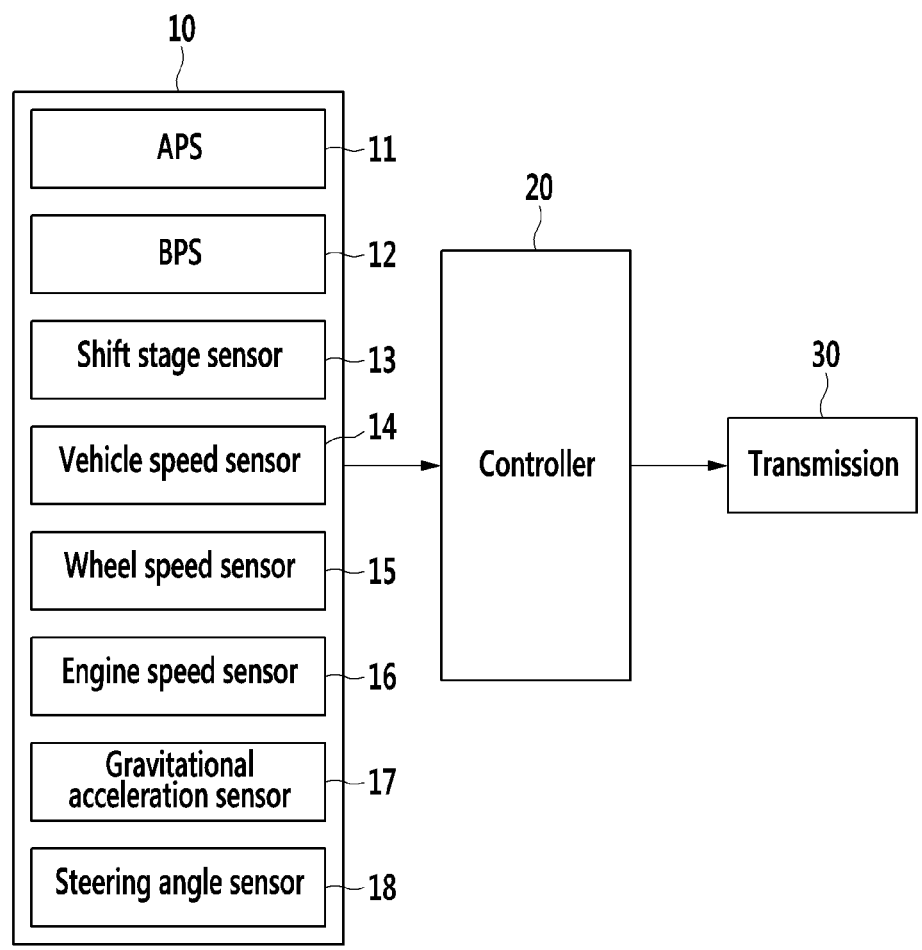
FIG. 1 is a block diagram of an apparatus for estimating road slope using a gravitational acceleration sensor according to an exemplary embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure.

Throughout this specification and the claims which follow, unless explicitly described to the contrary, the word "comprise" and variations such as "comprises" or "comprising" will be understood to imply the inclusion of stated elements but not the exclusion of any other elements.

Like reference numerals designate like elements throughout the specification.

An exemplary embodiment of the present disclosure will hereinafter be described in detail with reference to the accompanying drawings.

FIG. 1 is a block diagram of an apparatus for estimating road slope using a gravitational acceleration sensor according to an exemplary embodiment of the present disclosure.

As shown in FIG. 1, an apparatus for estimating road slope using a gravitational acceleration sensor according to an exemplary embodiment of the present disclosure may include a data detector 10, a controller 20, and a transmission 30.

The data detector 10 detects data related to road slope estimation for determining a running state of a vehicle and controlling a shift of the vehicle, and the data detected by the data detector 10 is transmitted to the controller 20. The data detector 10 may include an accelerator pedal position sensor 11, a brake pedal position sensor 12, a shift stage sensor 13, a vehicle speed sensor 14, a wheel speed sensor 15, an engine speed sensor 16, a gravitational acceleration sensor 17, and a steering angle sensor 18.

The accelerator pedal position sensor 11 detects a degree at which a driver pushes an accelerator pedal. The position value of the accelerator pedal may be 100% when the accelerator pedal is pressed fully, and the position value of the accelerator pedal may be 0% when the accelerator pedal is not pressed at all. That is, the accelerator pedal position sensor 11 detects data related to a driver's acceleration will.

The brake pedal position sensor 12 detects whether a brake pedal is pushed or not. The position value of the brake pedal may be 100% when the brake pedal is pressed fully, and the position value of the brake pedal may be 0% when the brake pedal is not pressed at all. That is, the brake pedal position sensor 12 detects the driver's acceleration or deceleration will in cooperation with the accelerator pedal position sensor 11.

The shift stage sensor 13 detects a shift stage that is currently engaged. The vehicle speed sensor 14 detects a vehicle speed, and may be mounted at a wheel of the vehicle. On the contrary, the vehicle speed may be calculated based on a signal received by the wheel speed sensor 15.

Meanwhile, a target shift-speed may be calculated by using a shift pattern based on the signal of the accelerator pedal position sensor 11 and the signal of the vehicle speed sensor 14, and the shift to the target shift-speed is thereby controlled. That is, hydraulic pressure supplied to a plurality of friction elements or released from a plurality of friction elements is controlled in an automatic transmission provided with a plurality of planetary gear sets and the plurality of friction elements. In addition, currents applied to a plurality of synchronizer devices and actuators are controlled in a double clutch transmission.

The wheel speed sensor 15 may detect a wheel rotation speed of the vehicle, and is mounted at a wheel of the vehicle. The wheel speed sensor 15 may control a brake hydraulic pressure when the wheel of the vehicle slips according to quick braking.

The engine speed sensor 16 may detect a rotation speed of the engine from a change in phase of a crankshaft or a camshaft.

The gravitational acceleration sensor 17 may detect acceleration of the vehicle. The gravitational acceleration sensor 17 may be mounted to the vehicle in addition to the vehicle speed sensor 14 and may directly detect the acceleration of the vehicle, or the gravitational acceleration sensor 16 may calculate the acceleration of the vehicle by differentiating the vehicle speed detected by the vehicle speed sensor 14.

Moreover, the gravitational acceleration sensor 17 may detect a longitudinal acceleration when the vehicle is located on a slope.

The steering angle sensor 18 may detect a steering angle of the vehicle. That is, the steering angle sensor 18 detects a direction in which the vehicle travels.

The controller 20 controls the transmission 30 based on information output from the data detector 10.

The controller 20 determines whether a driving mode of a vehicle is a towing or freight carrying mode based on the data detected by the data detector 10, and estimates road slope by correcting road slope measured using the gravitational acceleration sensor based on a difference value between road slope measured using the gravitational acceleration sensor and road slope measured using a driving torque when the driving mode of the vehicle is in the towing or freight carrying mode.

The controller 20 may estimate road slope using the gravitational acceleration sensor when the driving mode of the vehicle is not the towing or freight carrying mode. On the contrary, the controller 20 may estimate road slope using the driving torque when a signal of a chassis dynamometer is detected.

The controller 20 may determine whether a mode determination condition is satisfied and determine whether the driving mode of the vehicle is the towing or freight carrying mode by comparing the road slope using the gravitational acceleration sensor with a predetermined value when the mode determination condition is satisfied and the vehicle is not running below a predetermined speed for a predetermined time.

The controller 20 may change a shift pattern, an engaging feeling to the target shift-speed, an engine torque map, and/or an engine torque filter according to road slope calculated by correcting an error of the gravitational acceleration sensor.

For these purposes, the controller 20 may be implemented as at least one processor that is operated by a predetermined program, and the predetermined program may be programmed in order to perform each step of a method of estimating road slope using the gravitational acceleration sensor according to an exemplary embodiment of the present disclosure.

Various embodiments described herein may be implemented within a recording medium that may be read by a computer or a similar device by using software, hardware, or a combination thereof, for example.

According to a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units or components designed to perform any other functions.

According to software implementations, embodiments such as procedures and functions described in the present embodiments may be implemented by separate software modules. Each of the software modules may perform one or more functions and operations described in the present disclosure. A software code may be implemented by a software application written in an appropriate program language.

Figure 2:
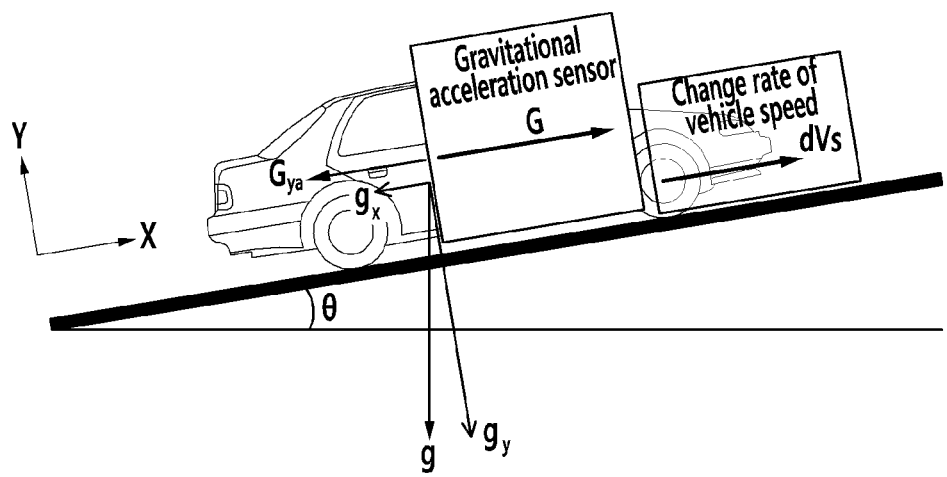
FIG. 2 is a drawing describing a road slope estimating principle using a gravitational acceleration sensor according to an exemplary embodiment of the present disclosure.

FIG. 2 is a drawing describing an estimating principle of road slope using a gravitational acceleration sensor according to an exemplary embodiment of the present disclosure.

The controller 20 may estimate road slope using the gravitational acceleration sensor according to the principle illustrated in FIG. 2, but it is not limited thereto.

Referring to FIG. 2, road slope may be calculated from the following equation:

$$\text{Road slope } (\%) = \tan\theta \cdot 100 = k \cdot (G - dVs)$$

Here, an angle θ indicates a slope of the vehicle on a road, G indicates a progress direction (horizontal) acceleration of the vehicle, and dVs indicates a change rate of the vehicle speed.

The G may be calculated from the equation below:

$$G = dVs + gx = dVs + g\sin\theta$$

In addition, k may be calculated from the equation below.

$$k = \frac{1}{g\sqrt{1-\sin^2\theta}}$$

In the above equation, g indicates gravitational acceleration of the vehicle.

Hereinafter, a method of estimating road slope using the gravitational acceleration sensor according to an exemplary embodiment of the present disclosure will be described in detail with reference to FIG. 3 and FIG. 4.

Figure 3:
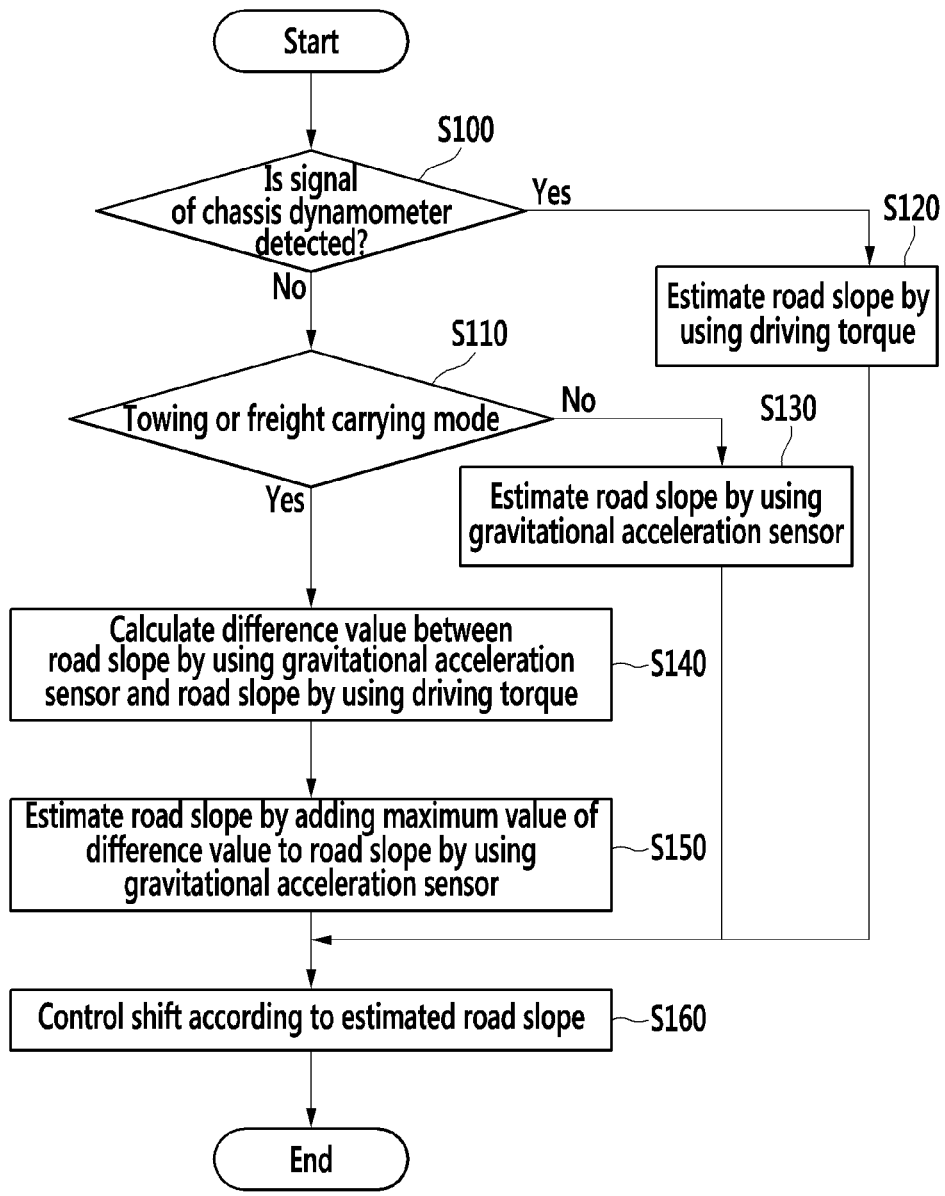
FIG. 3 is a flowchart of a method of estimating road slope using a gravitational acceleration sensor according to an exemplary embodiment of the present disclosure.

FIG. 3 is a flowchart of a method of estimating road slope using a gravitational acceleration sensor according to an exemplary embodiment of the present disclosure.

As shown in FIG. 3, a method of estimating road slope using a gravitational acceleration sensor according to an exemplary embodiment of the present disclosure may start with detecting a signal of a chassis dynamometer at step S100.

When the signal of chassis dynamometer is detected at step S100, the controller 20 may estimate road slope by using a driving torque at step S120.

If the signal of the chassis dynamometer is detected, it means that the vehicle drives in a procedure on the chassis dynamometer, so an output value of the gravitational acceleration sensor may be abnormally output. Therefore, the controller 20 may estimate road slope using the driving torque instead of using the gravitational acceleration sensor when the signal of the chassis dynamometer is detected.

On the other hand, when the signal of the chassis dynamometer is not detected at the step S100, the controller 20 determines whether a driving mode of a vehicle is a towing or freight carrying mode at step S110.

Figure 4:
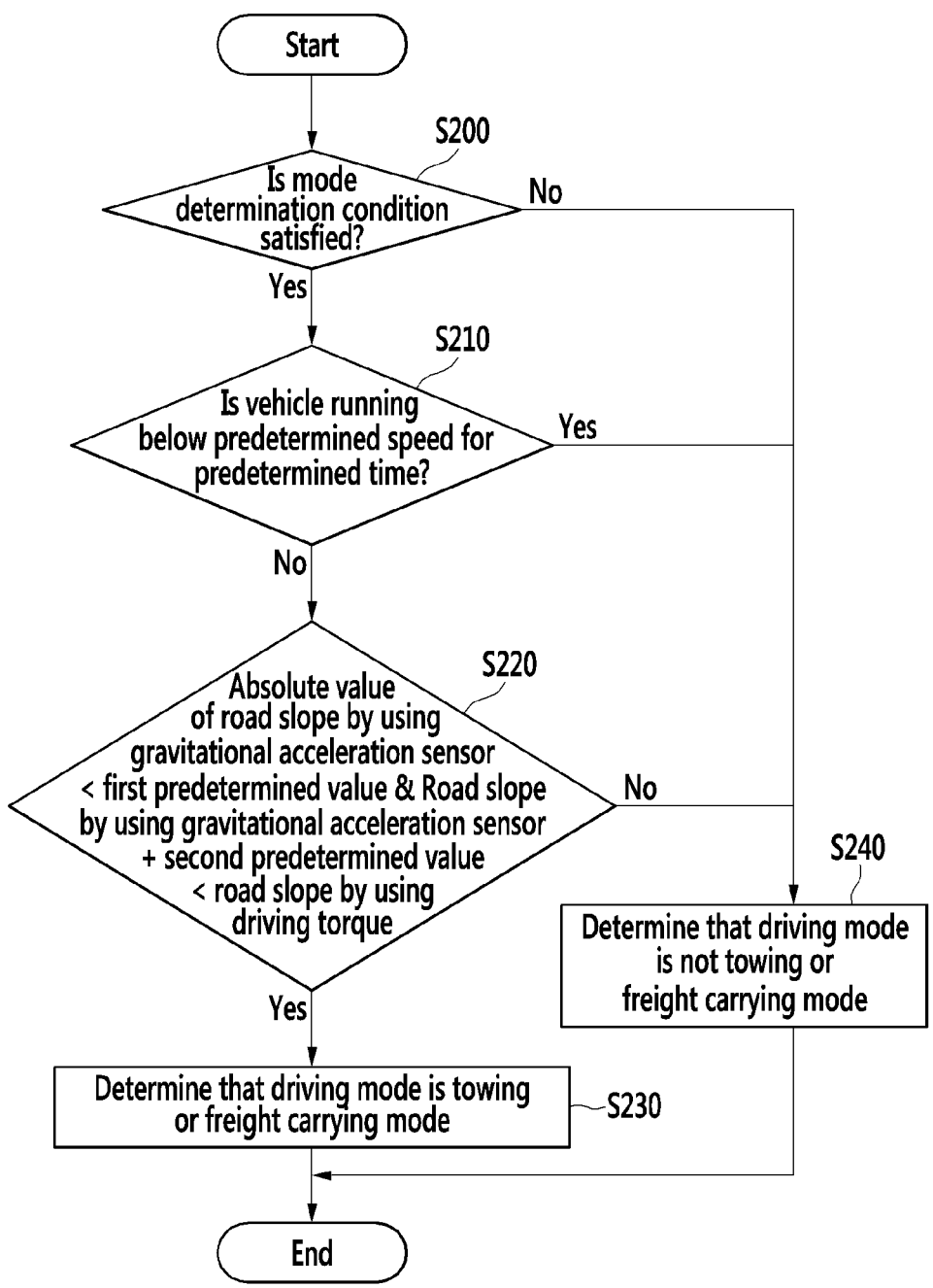
FIG. 4 is a flowchart showing partial steps of a method of determining whether a driving mode of a vehicle is a towing or freight carrying mode in detail according to an exemplary embodiment of the present disclosure.

The method of determining whether the driving mode of the vehicle is the towing or freight carrying mode is illustrated in FIG. 4.

FIG. 4 is a flowchart showing partial steps of a method of determining whether a driving mode of a vehicle is a towing or freight carrying mode in detail according to an exemplary embodiment of the present disclosure.

As shown in FIG. 4, the method of determining whether the driving mode of the vehicle is the towing or freight carrying mode may start with determining whether a mode determination condition is satisfied at step S200.

The mode determination condition may be satisfied when a shift stage is a D stage, signals of the gravitational acceleration sensor and a vehicle speed sensor are valid, and a vehicle speed, a position value of an accelerator pedal, an engine speed, and an engine torque are within predetermined ranges.

That is, the controller 20 may determine that the driving mode of the vehicle is not the towing or freight carrying mode when the shift stage is not the D stage or any one signal of the gravitational acceleration sensor or the vehicle speed sensor is not valid. Moreover, when any one of the vehicle speed, the position value of the accelerator pedal, the engine speed, and the engine torque is out of the predetermined range, the controller 20 determines that the driving mode of the vehicle is not the towing or freight carrying mode.

When the mode determination condition is satisfied at step S200, the controller 20 may determine whether the vehicle is running below a predetermined speed for a predetermined time at step S210.

In a low speed condition in which the vehicle is running below the predetermined speed for the predetermined time, detection of a driving resistance may be unnecessary. Therefore, the controller 20 may determine that the driving mode of the vehicle is not the towing or freight carrying mode when the vehicle is running below the predetermined speed for the predetermined time at the step S210.

On the contrary, when the vehicle is not running below the predetermined speed for the predetermined time at the step S210, the controller 20 compares the road slope using the gravitational acceleration sensor with a predetermined value at step S220.

At the step S220, the controller 20 may compare an absolute value of the road slope using the gravitational acceleration sensor with a first predetermined value and compare a sum of road slope using the gravitational acceleration sensor and a second predetermined value with the road slope by using the driving torque.

When the absolute value of the road slope by using the gravitational acceleration sensor is less than the first predetermined value and the sum of road slope using the gravitational acceleration sensor and the second predetermined value is less than the road slope using the driving torque, the controller 20 may determine that the driving mode of the vehicle is the towing or freight carrying mode at step S230.

On the other hand, when the absolute value of the road slope using the gravitational acceleration sensor is greater than or equal to the first predetermined value or the sum of road slope using the gravitational acceleration sensor and the second predetermined value is greater than or equal to the road slope using the driving torque, the controller 20 may determine that the driving mode of the vehicle is not the towing or freight carrying mode at step S240.

When the driving mode of the vehicle is not the towing or freight carrying mode at the step S110, the controller 20 may estimate road slope using the gravitational acceleration sensor at step S130.

On the contrary, if the driving mode of the vehicle is the towing or freight carrying mode at step S110, the controller 20 may calculate a difference value between road slope using the gravitational acceleration sensor and road slope using a driving torque at step S140.

When the difference value between road slope using the gravitational acceleration sensor and road slope using a driving torque is calculated at step S140, the controller 20 may estimate road slope by correcting road slope using the gravitational acceleration sensor based on the difference value.

That is, the controller 20 may estimate road slope by adding a maximum value of the difference value to the road slope using the gravitational acceleration sensor at step S150.

When the road slope is estimated at steps S120, S130 and S150, the controller 20 may control a shift of the vehicle according to the estimated road slope at step S160.

As described above, according to an exemplary embodiment of the present disclosure, shift of the vehicle can be controlled by reflecting driving resistance when the driving resistance is increased due to towing or carrying freight. Therefore, frequent shifting can be prevented and drivability of the vehicle can be improved.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A method of estimating road slope using a gravitational acceleration sensor, by a controller, comprising:
   determining whether a driving mode of a vehicle is a towing or freight carrying mode;
   calculating a difference value between road slope measured using the gravitational acceleration sensor and road slope measured using a driving torque when the driving mode of the vehicle is the towing or freight carrying mode;
   estimating road slope by correcting the road slope measured using the gravitational acceleration sensor based on the difference value; and
   controlling a shift of the vehicle according to the estimated road slope.

2. The method of claim 1, further comprising, when the driving mode of the vehicle is not the towing or freight carrying mode, estimating road slope by using the gravitational acceleration sensor.

3. The method of claim 1, further comprising:
   detecting a signal of a chassis dynamometer; and
   determining whether the driving mode of the vehicle is the towing or freight carrying mode when the signal of chassis dynamometer is not detected.

4. The method of claim 3, further comprising, when the signal of chassis dynamometer is detected, estimating road slope by using the driving torque.

5. The method of claim 1, wherein the estimation of road slope by correcting road slope using the gravitational acceleration sensor adds a maximum value of the difference value to the road slope by using the gravitational acceleration sensor.

6. The method of claim 1, wherein the determination of the driving mode of the vehicle comprises:
   determining whether a mode determination condition is satisfied;
   determining whether the vehicle is running below a predetermined speed for a predetermined time;
   comparing the road slope measured using the gravitational acceleration sensor with a predetermined value when the vehicle is not running below the predetermined speed for the predetermined time; and
   determining that the driving mode of the vehicle is the towing or freight carrying mode when the road slope measured using the gravitational acceleration sensor is less than the predetermined value.

7. The method of claim 6, wherein the mode determination condition is satisfied when a shift stage is a D stage, signals of the gravitational acceleration sensor and a vehicle speed sensor are valid, and a vehicle speed, a position value of an accelerator pedal, an engine speed, and an engine torque are within predetermined ranges.

8. The method of claim 6, wherein the comparison of the road slope measured using the gravitational acceleration sensor with the predetermined value compares an absolute value of the road slope measured using the gravitational acceleration sensor with a first predetermined value, and a sum of road slope measured using the gravitational acceleration sensor and a second predetermined value with the road slope measured using the driving torque.

9. An apparatus for estimating road slope using a gravitational acceleration sensor, comprising:
   a data detector configured to detect data for estimating road slope; and
   a controller configured to determine whether a driving mode of a vehicle is a towing or freight carrying mode and estimate road slope by correcting road slope measured using the gravitational acceleration sensor based on a difference value between road slope measured using the gravitational acceleration sensor and road slope measured using a driving torque when the driving mode of the vehicle is the towing or freight carrying mode.

10. The apparatus of claim 9, wherein the controller estimates road slope measured using the gravitational acceleration sensor when the driving mode of the vehicle is not the towing or freight carrying mode.

11. The apparatus of claim 9, wherein the controller detects a signal of a chassis dynamometer and determines whether the driving mode of the vehicle is the towing or freight carrying mode when the signal of the chassis dynamometer is not detected.

12. The apparatus of claim 11, wherein the controller estimates road slope measured using the driving torque when the signal of the chassis dynamometer is detected.

13. The apparatus of claim 9, wherein the controller estimates road slope by adding a maximum value of the difference value to the road slope measured using the gravitational acceleration sensor.

14. The apparatus of claim 9, wherein the controller determines whether a mode determination condition is satisfied and determines whether the driving mode of the vehicle is the towing or freight carrying mode by comparing the road slope measured using the gravitational acceleration sensor with a predetermined value when the mode determination condition is satisfied and the vehicle is not running below a predetermined speed for a predetermined time.

15. The apparatus of claim 14, wherein the mode determination condition is satisfied when a shift stage is a D stage, signals of the gravitational acceleration sensor and a vehicle speed sensor are valid, and a vehicle speed, a position value of an accelerator pedal, an engine speed, and an engine torque are within predetermined ranges.

16. The apparatus of claim 14, wherein the controller determines that the driving mode of the vehicle is the towing or freight carrying mode when an absolute value of the road slope measured using the gravitational acceleration sensor is less than a first predetermined value and a sum of road slope measured using the gravitational acceleration sensor and a second predetermined value is less than the road slope by using the driving torque.

17. The apparatus of claim 9, wherein the data includes information on at least one of a speed of the vehicle, a position value of an accelerator pedal, a position value of a brake pedal, a shift stage of the vehicle, a wheel speed of the vehicle, and engine speed and a steering angle of the vehicle.

* * * * *